(12) United States Patent
Kondoh et al.

(10) Patent No.: US 11,037,575 B2
(45) Date of Patent: Jun. 15, 2021

(54) SERVER DEVICE AND SERVER CLIENT SYSTEM

(71) Applicant: SHARP KABUSHIKI KAISHA, Sakai (JP)

(72) Inventors: Katsuyoshi Kondoh, Sakai (JP); Akinori Ohnishi, Sakai (JP); Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 165 days.

(21) Appl. No.: 16/147,726

(22) Filed: Sep. 29, 2018

(65) Prior Publication Data

US 2019/0103117 A1    Apr. 4, 2019

(30) Foreign Application Priority Data

Sep. 29, 2017   (JP) .............................. JP2017-191549

(51) Int. Cl.
| | |
|---|---|
| *H04N 21/436* | (2011.01) |
| *G10L 17/22* | (2013.01) |
| *G10L 15/06* | (2013.01) |
| *G06F 21/32* | (2013.01) |
| *G10L 17/24* | (2013.01) |
| *G10L 17/00* | (2013.01) |
| *H04L 29/06* | (2006.01) |

(52) U.S. Cl.
CPC ............. *G10L 17/22* (2013.01); *G06F 21/32* (2013.01); *G10L 15/06* (2013.01); *G10L 17/00* (2013.01); *G10L 17/24* (2013.01); *H04L 63/0861* (2013.01); *H04N 21/43615* (2013.01)

(58) Field of Classification Search
CPC ................ G10L 17/00; H04L 63/0861; H04N 21/43615
See application file for complete search history.

(56) References Cited

U.S. PATENT DOCUMENTS

| | | | |
|---|---|---|---|
| 2007/0055517 A1* | 3/2007 | Spector | G06F 21/32 704/246 |
| 2010/0031299 A1* | 2/2010 | Harrang | H04N 21/44029 725/80 |
| 2010/0158207 A1* | 6/2010 | Dhawan | G10L 17/22 379/88.02 |
| 2013/0014240 A1 | 1/2013 | Osuki | |
| 2015/0025888 A1* | 1/2015 | Sharp | G10L 17/04 704/246 |

FOREIGN PATENT DOCUMENTS

| | | |
|---|---|---|
| CN | 103106360 A | 5/2013 |
| CN | 104834853 A | 8/2015 |
| JP | 2007-052496 A | 3/2007 |
| JP | 2008-257441 A | 10/2008 |

\* cited by examiner

*Primary Examiner* — Feng-Tzer Tzeng
(74) *Attorney, Agent, or Firm* — ScienBiziP, P.C.

(57) ABSTRACT

Identification information is stored in association with a user. The identification information is received from an identification device, speech data is received from a speech input and output device, and speech identification information is recognized from the speech data. At this time, when the identification information and the speech identification information match each other, the user corresponding to the identification information is permitted to log in.

13 Claims, 17 Drawing Sheets

| DEVICE ID | USER ID |
|---|---|
| 1234-5678-9012 | MU119 |
| 3456-7890-1234 | OH108 |
| ⋮ | ⋮ |

FIG. 6

| SPEECH INPUT AND OUTPUT DEVICE ADDRESS | CLIENT DEVICE ADDRESS |
|---|---|
| 192.168.0.19 | 192.168.0.119 |
| 192.168.0.8 | 192.168.0.108 |
| ⋮ | ⋮ |

FIG. 7

| USER ID | MEETING NAME | LAYOUT DATA | CONTENT DATA | LAST UPDATE DATE AND TIME |
|---|---|---|---|---|
| MU119 | SPECIFICATION REVIEW | lay1 | mtg.doc | 2017/7/24 17:00 |
| OH108 | OVERSEAS PLANNING MEETING | lay2 | plannng.ppt, mtg.memo | 2017/7/21 10:00 |
| OH108 | QUALITY MEETING | lay3 | QA.ppt, QAmtg.docx | 2017/7/28 16:00 |
| ⋮ | ⋮ | ⋮ | ⋮ | ⋮ |

FIG. 10

| DEVICE ID | USER ID | LAST LOGIN DATE AND TIME | LOGIN TIME LIMIT |
|---|---|---|---|
| 1111-2222-3331 | GU001 | N/A | 2017/08/01 20:00 |
| 1111-2222-3332 | GU002 | 2017/07/26 13:02 | LAST LOGIN DATE AND TIME + 5 HOURS |
| ⋮ | ⋮ | ⋮ | ⋮ |

FIG. 12

| DEVICE ID | USER ID | DEPARTMENT NAME |
|---|---|---|
| 1234-5678-9012 | MU119 | DEVELOPMENT DEPARTMENT |
| 3456-7890-1234 | OH108 | MANAGEMENT DEPARTMENT |
| ⋮ | ⋮ | ⋮ |

FIG. 13

| DEPARTMENT NAME | ADDRESS GROUP OF CLIENT DEVICE |
|---|---|
| DEVELOPMENT DEPARTMENT | 192.168.0.119, 192.168.0.120 |
| MANAGEMENT DEPARTMENT | ALL |
| ⋮ | ⋮ |

FIG. 15

| DEVICE ID | USER ID | REGISTRATION KEYWORD | QUESTION 1 | QUESTION 2 | ... |
|---|---|---|---|---|---|
| 1234-5678-9012 | MU119 | WALTER | TOKYO | GRILLED FISH | ... |
| 3456-7890-1234 | OH108 | STEVE | – | – | ... |
| ⋮ | ⋮ | ⋮ | ⋮ | ⋮ | ⋮ |

FIG. 16

| QUESTION ID | QUESTION CONTENT |
|---|---|
| QUESTION 1 | WHAT IS YOUR NATIVE COUNTRY? |
| QUESTION 2 | WHAT IS YOUR FAVORITE FOOD? |
| ⋮ | ⋮ |

| USER ID | USER NAME |
|---------|-----------|
| MU119   | MUNAKATA  |
| OH108   | OMORI     |
| ⋮       | ⋮         |

| USER ID | FINGERPRINT DATA | AVAILABLE TIME LIMIT |
|---------|------------------|----------------------|
| MU119 | fingerprint1.dat | 2017/12/31 23:59 |
| OH108 | fingerprint2.dat | 2018/03/31 23:59 |
| ⋮ | ⋮ | ⋮ |

SERVER DEVICE AND SERVER CLIENT SYSTEM

BACKGROUND

1. Field

The present disclosure relates to a server device or the like.

2. Description of the Related Art

In the related art, various mechanisms for enabling a user to log in to a server and receive various services are provided. For example, when a file sharing service, a service such as a social networking service (SNS), or a service such as an electronic mail service is used, the user logs in to a server that provides each service.

When information is shared or a meeting is held in a company, a user may log in to an internal server of the company. For example, when the meeting is held, a meeting support system that displays materials on a large display device and enables the meeting to advance while seeing the display device is provided.

For example, a meeting support system that causes a display device to display review items or issues designated in the previous meeting each time the user logs in to a host computer is disclosed (for example, see Japanese Unexamined Patent Application Publication NO. 2008-257441).

A technique for enabling a user to easily log in is also suggested. For example, a user authentication system that includes a voice print authentication unit is disclosed. The user authentication system restrains voice print authentication from being erroneously determined by updating a user profile by using the latest voice print data obtained at the time of user authentication even though the voice print data is changed with time due to a change in a body shape and vocal fold of the user (for example, see Japanese Unexamined Patent Application Publication No. 2007-52496).

Here, in general, when a user logs in, the user is authenticated in order to specify who the user is. In this case, the user makes effort to remember a login ID and a password and correctly input the login ID and password. A meeting support system including a large display device may dispense with a physical keyboard and be provided with an input unit such as a software keyboard. In this case, there is a problem that a password input is easily seen by a third party at the time of login.

In a login system of the related art, information for identifying the user is registered in advance in a server device. For example, when speech authentication is used, the user makes effort to register voice print information in advance for identifying the user by using voice print. The speech authentication has a possibility that authentication will fail due to influence of external noise.

It is desirable to provide a server device or the like enabling a user to easily log in by using identification information to be transmitted from an identification device and speech of the user.

SUMMARY

According to an aspect of the disclosure, there is provided a server device that communicates with a client device capable of processing a content corresponding to a user. The server device includes an identification information storage unit that stores identification information in association with the user, an identification information reception unit that receives the identification information from an identification device, an identification information recognition unit that receives speech data from a speech input and output device, and recognizes speech identification information from the speech data, a login unit that permits the user corresponding to the identification information to log in when the identification information and the speech identification information match each other, and a content display control unit that causes the client device to display the content associated with the user permitted to log in by the login unit on the client device.

According to another aspect of the disclosure, there is provided a server device that communicates with a client device capable of processing a content corresponding to a user. The server device includes an identification information storage unit that stores identification information in association with the user, an identification information reception unit that receives the identification information from an identification device, an identification information recognition unit that receives speech data from a speech input and output device, and recognizes speech identification information from the speech data, a user identification information transmission unit that transmits, to the client device, user identification information of the user corresponding to the identification information when the identification information and the speech identification information match each other, and a content display control unit that causes the client device to display the content associated with the user on the client device.

According to still another aspect of the disclosure, there is provided a server client system including a client device capable of processing a content corresponding to a user, an identification device that stores identification information, and a server device that communicates with the client device. The identification device includes an identification information transmission unit that transmits the identification information to the server device through a selection operation by the user. The server device includes an identification information storage unit that stores the identification information in association with the user, an identification information reception unit that receives the identification information from the identification device, an identification information recognition unit that receives speech data from a speech input and output device, and recognizes speech identification information from the speech data, a login unit that permits the user corresponding to the identification information to log in when the identification information and the speech identification information match each other, and a content transmission unit that transmits, to the client device, the content associated with the user permitted to log in by the login unit to. The client device includes a content display control unit that receives the content from the server device, and performs a control to display the content.

According to still another aspect of the disclosure, there is provided a server client system including a client device capable of processing a content corresponding to a user, an identification device that stores identification information, and a server device that communicates with the client device. The identification device includes an identification information transmission unit that transmits the identification information to the server device through a selection operation by the user. The server device includes an identification information storage unit that stores the identification information in association with the user, an identification information reception unit that receives the identification information from the identification device, an identification information recognition unit that receives speech data from a speech input and output device, and recognizes speech identification information from the speech data, a user identification information transmission unit that transmits, to the client device, user identification information of the user corresponding to the identification information when the identification information and the speech identification information match each other, a login permission information reception unit that receives login permission information to be transmitted from the client device, and a content transmission unit that transmits, to the client device, the content, associated with the user permitted to log in, based on the received login permission information. The client device includes a login information reception unit that receives the user identification information from the server device, a login permission unit that permits the user corresponding to the user identification information to log in based on the user identification information, a login permission information transmission unit that transmits the login permission information to the server device when the user is permitted to log in, and a content display control unit that receives the content from the server device, and performs a control to display the content.

According to still another aspect of the disclosure, there is provided a non-transitory recording medium storing a program causing a computer of a server device that communicates with a client device capable of processing a content corresponding to a user to execute an identification information storage function of storing identification information in association with the user, an identification information reception function of receiving the identification information from an identification device, an identification information recognition function of receiving speech data from a speech input and output device, and recognizing speech identification information from the speech data, a login function of permitting the user corresponding to the identification information to log in when the identification information and the speech identification information match each other, and a content display control function of causing the client device to display the content associated with the user permitted to log in through the login function.

According to still another aspect of the disclosure, there is provided a non-transitory recording medium storing a program causing a computer of a server device that communicates with a client device capable of processing a content corresponding to a user to execute an identification information storage function of storing identification information in association with the user, an identification information reception function of receiving the identification information from an identification device, an identification information recognition function of receiving speech data from a speech input and output device, and recognizing speech identification information from the speech data, a user identification information transmission function of transmitting, to the client device, user identification information of the user corresponding to the identification information when the identification information and the speech identification information match each other, and a content display control function of causing the client device to display the content associated with the user.

BRIEF DESCRIPTION OF THE DRAWINGS

FIG. 6 is a diagram illustrating an example of a data structure of address correspondence information according to the first embodiment;

FIG. 7 is a diagram illustrating an example of a data structure of content information according to the first embodiment;

FIG. 10 is a diagram illustrating an example of a data structure of device information according to a second embodiment;

FIG. 12 is a diagram illustrating an example of a data structure of device information according to a third embodiment;

FIG. 13 is a diagram illustrating an example of a data structure of available client information according to the third embodiment;

FIG. 15 is a diagram illustrating an example of a data structure of device information according to a fourth embodiment;

FIG. 16 is a diagram illustrating an example of a data structure of question information according to the fourth embodiment;

DESCRIPTION OF THE EMBODIMENTS

Hereinafter, embodiments for implementing the present disclosure will be described with reference to the drawings. For the sake of convenience in description, although an example in which a display device of the present disclosure is applied to a display device integrally provided with a touch panel will be described as an embodiment, any display device may be applied as long as a user is able to perform operations on a content through an operation input by the user.

1. First Embodiment

1.1 Entire Structure

Figure 1:
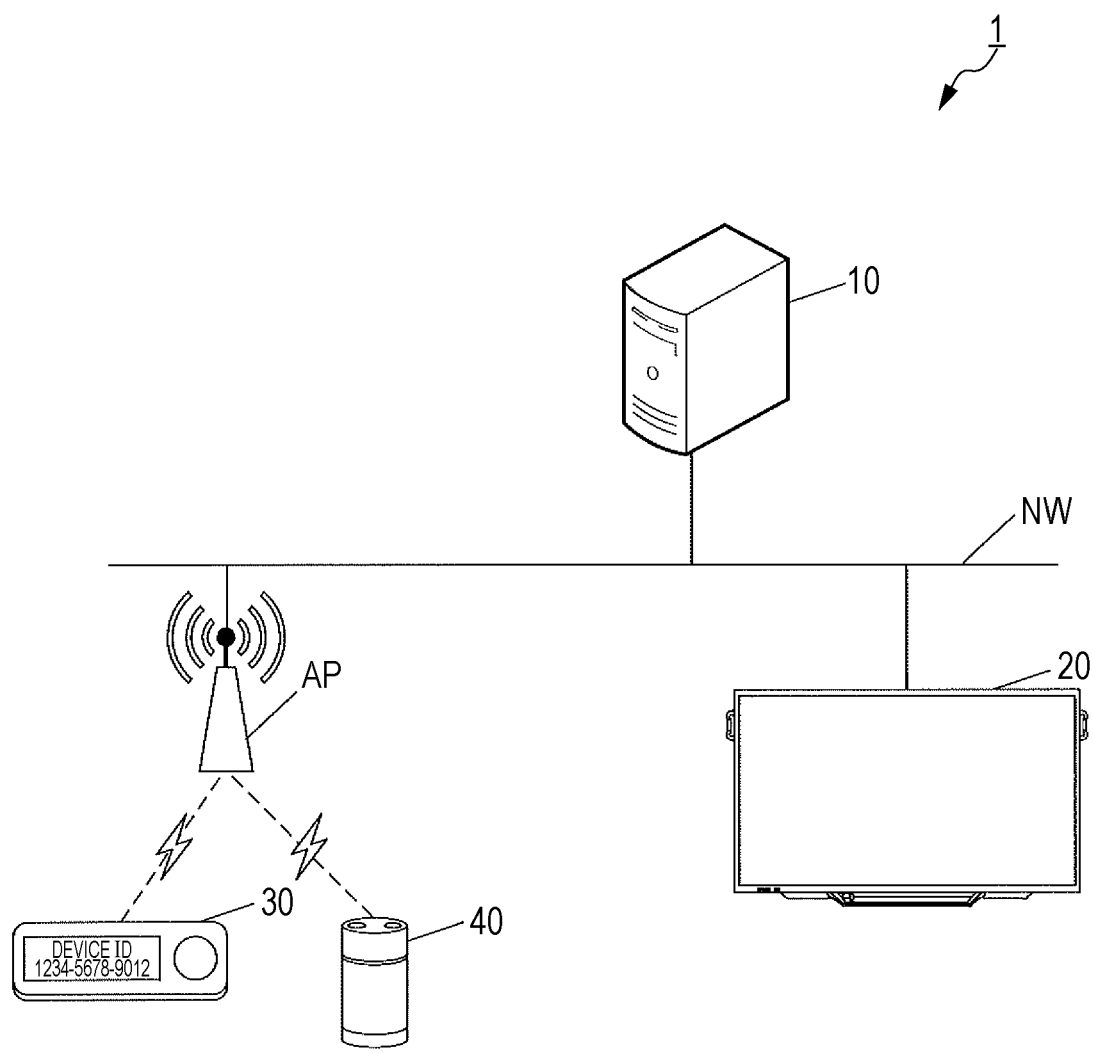
FIG. 1 is a diagram for describing the entire structure of a meeting support system according to a first embodiment.

Initially, FIG. 1 illustrates an external appearance of a meeting support system 1 including a server device 10 to which the present disclosure is applied. The meeting support system according to the present embodiment is configured such that the server device 10, a client device 20, and an access point (AP) are connected to each other via a network (NW). An identification device 30 and a speech input and output device 40 are connected to the AP. In FIG. 1, the devices depicted in this drawing are connected to the same network, but the devices may be connected to each other via an external network such as the Internet. For example, the server device 10 may be disposed in a cloud environment.

1.2 Functional Structure

1.2.1 Server Device

Figure 2:
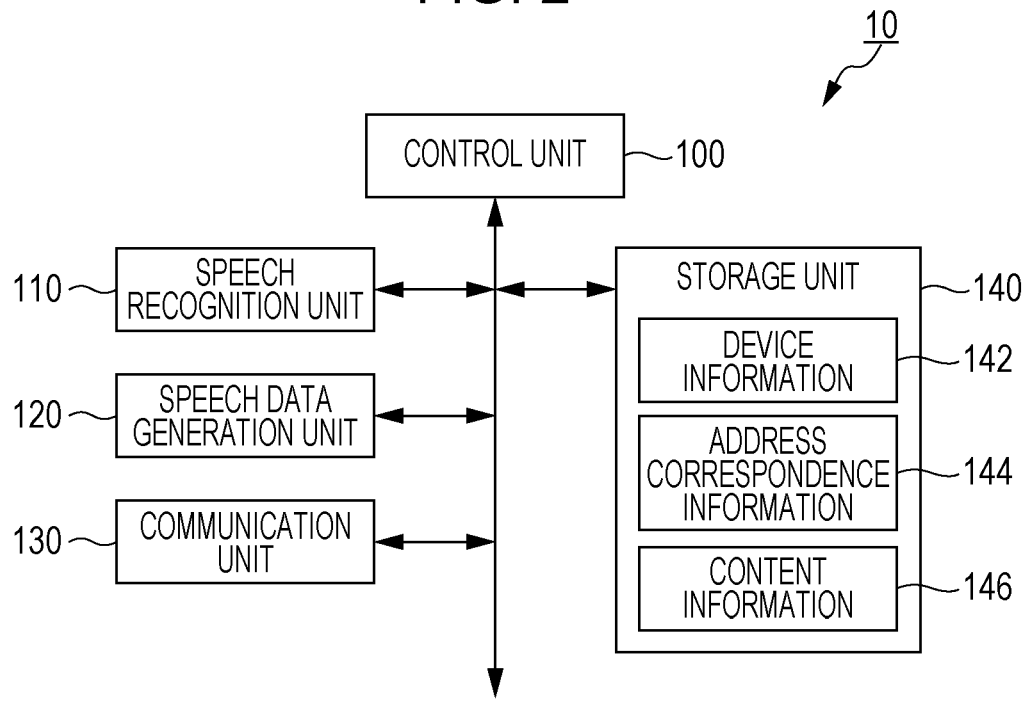
FIG. 2 is a diagram for describing a functional structure of a server device according to the first embodiment.

Next, a functional structure of the server device 10 will be described with reference to FIG. 2. The server device 10 includes a control unit 100, a speech recognition unit 110, a speech data generation unit 120, a communication unit 130, and a storage unit 140.

The control unit 100 is a functional unit for controlling the entire server device 10. The control unit 100 realizes various functions by reading out various programs and executing the readout programs, and is constituted by, for example, a central processing unit (CPU).

The speech recognition unit 110 is a functional unit that recognizes speech data, converts the recognized speech data into text data, and outputs the text data. Any known method may be used as a technique used for identifying the speech data and converting the identified speech data into the text data. For example, Julius which is a general-purpose large vocabulary continuous speech recognition engine may be used. Speech data may be transmitted to an external service that performs speech recognition via the network, and a recognition result may be received from the external service.

The speech data generation unit 120 is a functional unit that generates data to be used to produce prescribed speech through the speech input and output device 40. For example, when the speech input and output device 40 is able to play a speech file, a speech file in a file format such as MPEG-1 Audio Layer-3 (MP3) or Advanced Audio Coding (AAC) is generated.

The communication unit 130 is a functional unit that enables the server device 10 to communicate with an external device. For example, the communication unit is realized by a network interface card (NIC) used in a wired/wireless local area network (LAN) or a communication module capable of being connected to 3G/LTE line.

The storage unit 140 is a functional unit that stores various programs or various data items to be used in the operation of the server device 10. For example, the storage unit 140 is constituted by, for example, a solid state drive (SSD) which is a semiconductor memory or a hard disk drive (HDD).

Particularly, the storage unit 140 stores device information items 142 which are information items obtained by associating identification devices 30 with users who own identification devices 30, address correspondence information items 144 obtained by client devices 20 with speech input and output devices 40, and content information items 146 that have a content to be displayed on the client devices 20 in association with the users.

The details of the device information items 142 will be described with reference to FIG. 5. Device IDs (for example, "1234-5678-9012") for identifying the identification devices and user IDs (for example, "MU119") which are user identification information items for identifying the users are stored as the device information items 142. That is, it is assumed in the present embodiment that one identification device 30 is owned by one user. A correspondence relationship between the device IDs which are the identification information items of the identification devices 30 and the user IDs which are the user identification information items is stored as the device information items 142.

The device ID is a number capable of uniquely specifying the identification device 30. As the device ID, a serial number of the identification device 30 may be used or a character string determined by an administrator of the meeting support system 1 may be used. An address such as an Internet Protocol (IP) address or a media access control (MAC) address may be used, and any information may be used as long as information can uniquely specify the identification device 30.

The details of the address correspondence information items 144 will be described with reference to FIG. 6. Addresses (for example, "192.168.0.19") of the speech input and output devices 40 and addresses (for example, "192.168.0.119") of the client devices 20 are stored as the address correspondence information items 144. Although it has been described in the present embodiment that an IPv4 address is stored as the address, information items, such as an IPv6 address and a MAC address, which are capable of specifying the speech input and output device 40 and the client device 20 in the NW may be stored.

In the present embodiment, the combinations of the speech input and output devices 40 with the client devices 20 in one-to-one correspondence are used, and the correspondence relationship between these combinations is stored as the address correspondence information items 144. That is, when an operation of login is performed by using a prescribed speech input and output device 40, the login is performed for the corresponding client device 20.

For example, when there is a plurality of meeting rooms in which the users may use the meeting support system 1, it is assumed that one speech input and output device 40 and one client device 20 are prepared in each meeting room, and the speech input and output device 40 and the client device 20 are associated with each other for each meeting room. In this case, when an operation of login is performed by using the speech input and output device 40 installed in a certain meeting room, the login is permitted for the client device 20 installed in the meeting room.

The details of the content information items 146 will be described with reference to FIG. 7. The user IDs (for example, "MU119") for identifying the users which are owners of the content information items, meeting names (for example, "specification review"), layout data items (for example, "lay1") that define how to display content data items on the client devices 20, content data items (for example, "mtg.doc") which are contents to be displayed on the client devices 20, and last update dates and times (for example, "2017/07/24 17:00") when the content information items are finally updated are stored as the content information items 146.

The layout data is data that defines display configurations of the content data such as coordinates in which the content data is displayed, a height or a width of a display region, a magnification ratio, and a page number. Display configurations of the content may be stored in a file, and a file name or a file path of the file may be stored as the layout data. In the present embodiment, the file name of the file in which display configuration information of the content is stored is stored as the layout data.

For example, as the content data items, data of a file in a presentation format may be stored with no change, or the file name or the file path of the file which is the substance of the content entity may be stored. In the present embodiment, the file name of the file which is the substance of the content is stored as the content data items.

The client device 20 is returned to be in a display state when the content information is stored by reading the layout data and the content data and displaying the content data on the client device 20 according to the configurations defined in the layout data. The content information may be stored according to an instruction of the user or when the meeting is ended. The content information including an operation (for example, a drawing operation) performed for the content data may be stored.

1.2.2 Client Device

Figure 3:
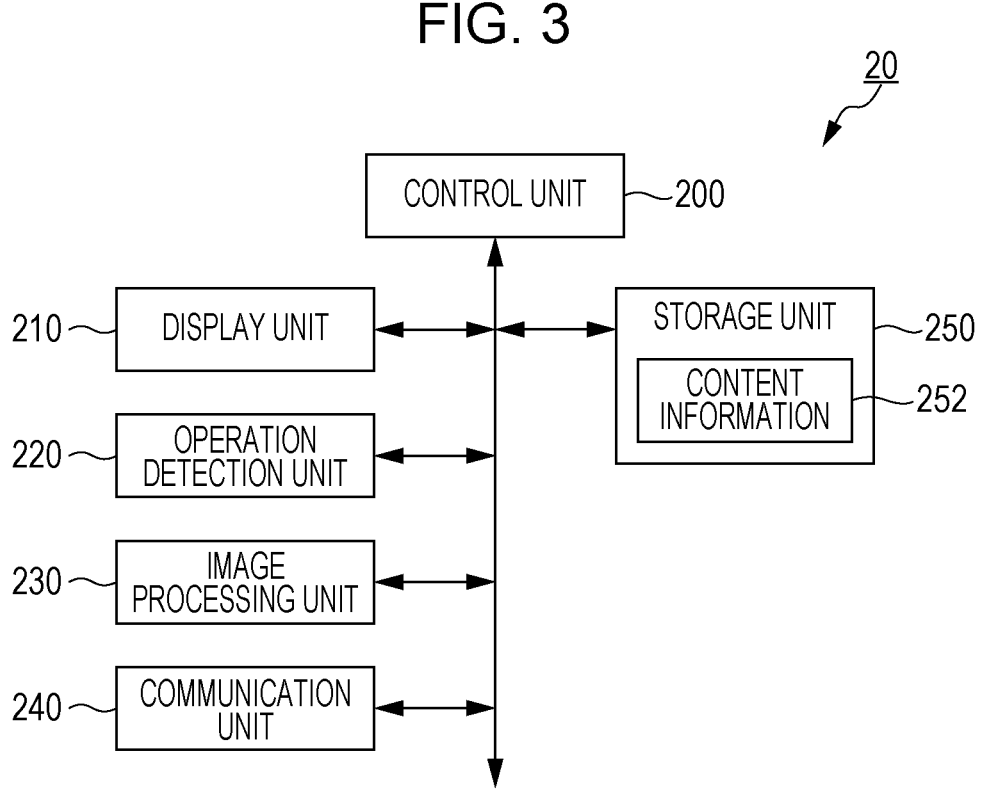
FIG. 3 is a diagram for describing a functional structure of a client device according to the first embodiment.

Next, a functional structure of the client device 20 will be described with reference to FIG. 3. The client device 20 includes a control unit 200, a display unit 210, an operation detection unit 220, an image processing unit 230, a communication unit 240, and a storage unit 250.

The control unit 200 is a functional unit that controls the entire client device 20. The control unit 200 realizes various functions by reading out various programs and executing the readout programs, and is constituted by, for example, a CPU.

The operation detection unit 220 is a functional unit that detects an operation from the user. For example, the operation detection unit is constituted by a touch panel integrally provided with the display unit 210 or a hardware button. As a method of detecting the operation using the touch panel, any method such as an electrostatic capacity type, a pressure-sensitive type such as a resistance film type, and an infrared type may be applied.

The image processing unit 230 is a functional unit that processes an image to be displayed on the display unit 210. For example, sharpening or color adjusting as general image processing may be performed on image data.

The communication unit 240 is a functional unit that enables the client device 20 to communicate with an external device. For example, the communication unit 240 is realized by a NIC used in a wired/wireless LAN or a communication module capable of being connected to a 3G/LTE line.

The storage unit 250 is a functional unit that stores various programs or various data items to be used in the operation of the client device 20. For example, the storage unit 250 is constituted by an SSD which is a semiconductor memory or an HDD.

Particularly, the storage unit 250 stores content information items 252 that store the content data items received from the server device 10. In the present embodiment, only information items among the content information items 146 stored in the server device 10, which are requested from the client device 20 to the server device 10, are received and stored as the content information items 252.

1.2.3 Identification Device

Next, a functional structure of the identification device 30 will be described with reference to FIG. 4. The identification device 30 includes a control unit 300, an operation detection unit 310, a communication unit 320, and a storage unit 340.

The control unit 300 is a functional unit that controls the entire identification device 30. The control unit 300 realizes various functions by reading out various programs and executing the readout programs, and is constituted by, for example, a CPU or a microcontroller.

The operation detection unit 310 is a functional unit that detects an operation of the user. For example, a button is provided on the identification device 30, and a state (of whether or not the button is pressed) of the button is detected.

The communication unit 320 is a functional unit that enables the identification device 30 to communicate with an external device. For example, the communication unit 320 is a functional unit capable of performing communication through a wireless LAN, and is Ethernet (registered trademark) or IEEE 802.11a/b/g/n as a communication scheme.

The storage unit 340 is a functional unit that stores various programs or various data items to be used in the operation of the identification device 30. For example, the storage unit 340 is constituted by a flash memory.

Particularly, the storage unit 340 stores device IDs 342 for identifying identification devices 30. For example, it is assumed that the device ID is constituted by a fixed-digit character string including alphanumeric characters and symbols and different device IDs are stored in different identification devices 30. In the present embodiment, an example in which the device ID 342 is constituted by numbers made of 12 digits will be described.

The character string stored as the device ID 342 may be displayed on a front surface of the identification device 30. By doing this, the user can view the device ID which is the identification information, and thus, there is no necessity of storing the identification information.

1.2.4 Speech Input and Output Device

The speech input and output device 40 includes a control unit that controls the speech input and output device 40, a speech input unit such as a microphone, a speech output unit such as a speaker, and a communication unit that enables the speech input and output device 40 to communicate with an external device. The speech input and output device 40 performs a control such that speech input through the speech input unit is converted into speech data, the speech data is transmitted to an external device, and speech data received from the external device is output by the speech output unit.

The speech input and output device 40 may be any type as long as the speech input and output device includes the speech input unit, the speech output unit, and the communication unit and is associated with the client device 20. For example, the speech input and output device may be a smartphone or a small computer such as a tablet, or a speech output unit such as a microphone or a speaker built in the client device 20 may be used. The speech input and output device 40 and the client device 20 may be connected to each other in a wired manner.

1.3 Flow of Processing

Figure 8:
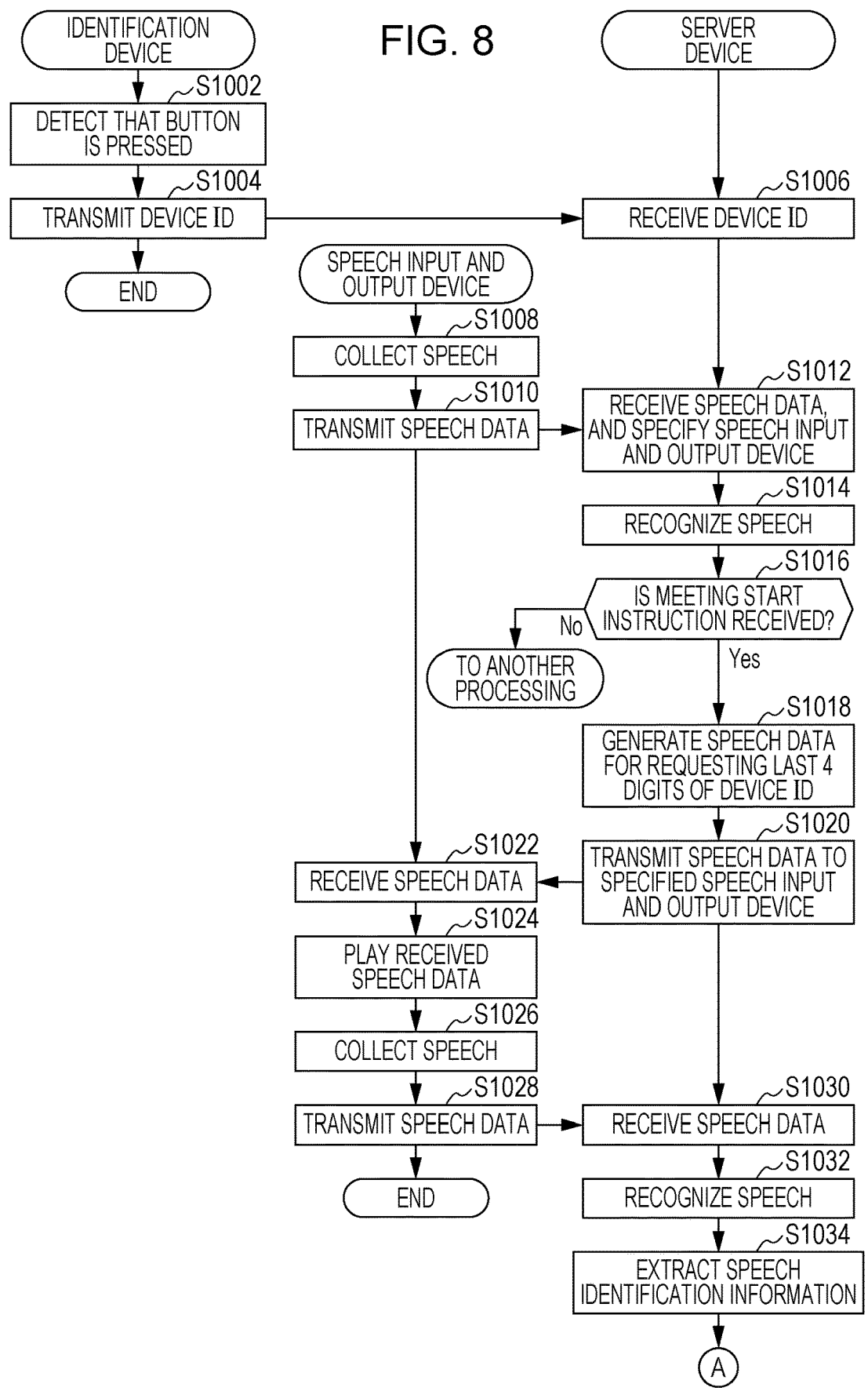
FIG. 8 is a diagram for describing a processing flow according to the first embodiment.
Figure 9:
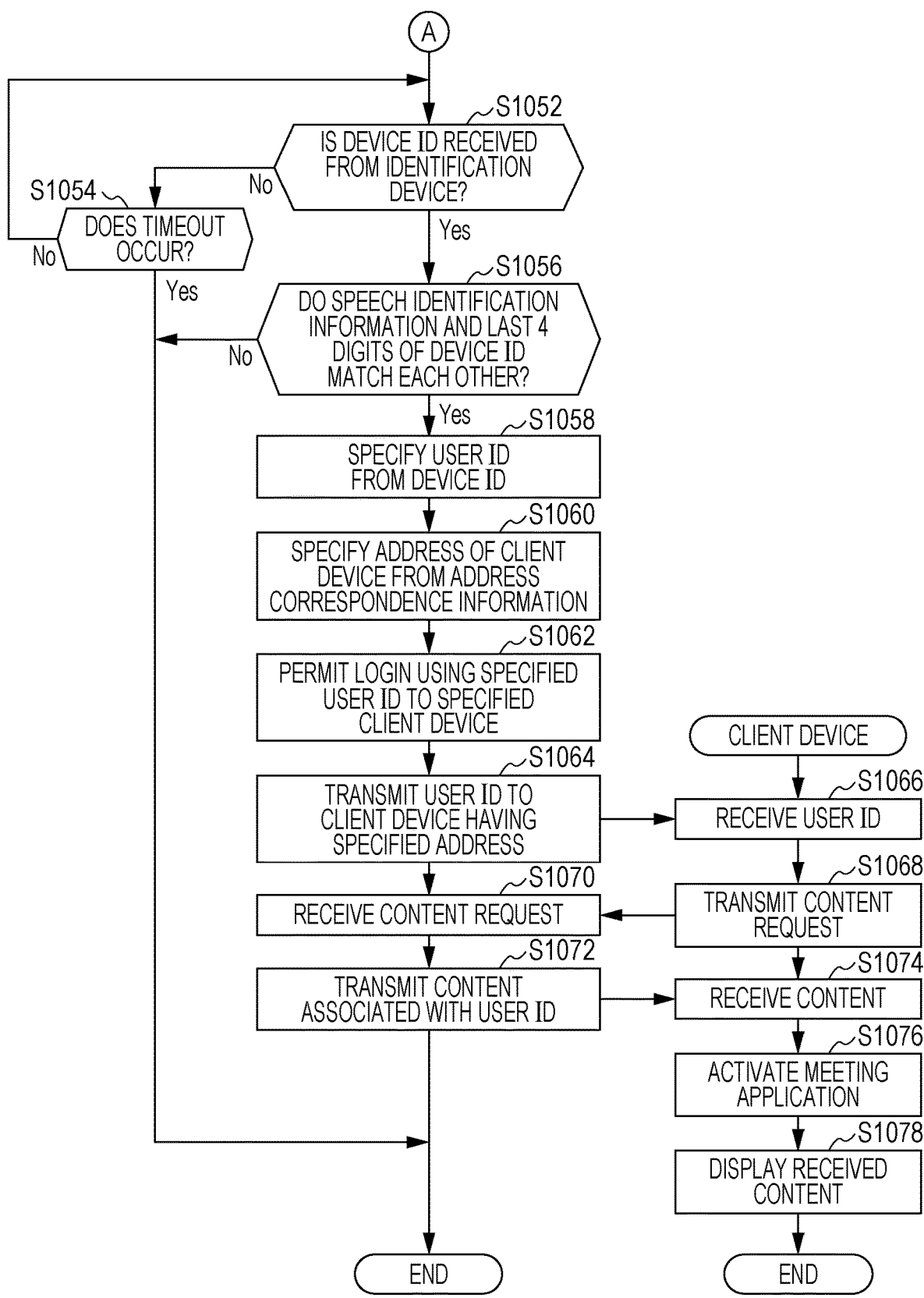
FIG. 9 is a diagram for describing a processing flow according to the first embodiment.

Next, a processing flow in the present embodiment will be described with reference to FIGS. 8 and 9. Initially, when the identification device 30 detects that the button of the identification device 30 is pressed through the operation of the user, the identification device 30 transmits the device ID of the identification device 30 to the server device 10 (S1002; Yes→S1004). When the server device 10 receives the device ID (S1006), the server device 10 enters a standby state for a prescribed time in order to receive speech data.

Thereafter, the user instructs the speech input and output device 40 to start a meeting through speech. The speech input and output device 40 transmits speech produced by the user while collecting the speech to the server device 10, as the speech data (S1008→S1010).

The server device 10 receives the speech data, and specifies the speech input and output device 40 which is a transmission source (S1012). In the present embodiment, an example in which the speech input and output device 40 transmits the speech data including the address of the speech input and output device 40 and the server device 10 specifies the speech input and output device 40 as the transmission source by using the transmitted address will be described.

Subsequently, the server device 10 performs the speech recognition of the speech data received by the speech recognition unit 110 from the speech input and output device 40 (S1014). When the received speech data is a meeting start instruction as a result of the speech recognition, the speech data generation unit 120 generates the speech data for requesting speech identification information (S1016; Yes→S1018).

The speech identification information is information used obtained by performing the speech recognition of the speech data input from the user, and is information used to verify that the identification device 30 is operated by the user. In the present embodiment, since the device ID which is the identification information is received in S1006, the speech data generation unit generates speech requesting the speech identification information regarding the device ID.

The speech identification information may be the whole identification information or may be part of the identification information. When the speech identification information is part of the identification information, a portion of the identification information from what number of characters to what number of characters is designated as the speech identification information when the speech data for requesting the speech identification information is generated. The designation of the portion to be used as the speech identification information may be configured for the server device 10 in advance, or may be determined whenever the speech identification information is requested.

After the speech identification information is requested, the server device 10 extracts the speech identification information based on the speech input to the speech input and output device 40 by the user, and determines whether or not the extracted speech identification information matches the identification information. It is possible to verify that the identification device is operated by the user by determining whether or not the speech identification information matches the identification information.

As the case where the extracted speech identification information matching the identification information, there are the following cases.

(1) A case where the whole identification information is used as the speech identification information is a case where the speech identification information and the identification information are equal to each other (perfect matching).

(2) A case where part of the identification information is used as the speech identification information is a case where the speech identification information and information in a position designated as the portion of the identification information to be used as the speech identification information are equal to each other (partial matching).

In the present embodiment, an example in which the device ID which is the identification information is constituted by numbers made of 12 digits and the numbers of last 4 digits of the device ID are designated as the speech identification information will be described. That is, when the numbers of the last 4 digits of the device ID (identification information) received in S1006 match the speech identification information (partial matching), it is possible to verify that the identification device 30 is operated by the user. Accordingly, the speech data such as "Please input last 4 digits of device ID" is generated in S1018.

Subsequently, the speech data generated in S1018 is transmitted to the speech input and output device 40 specified in S1012 (S1020). When the server device 10 detects that the speech data which is not the meeting start instruction is received in S1016, processing based on a result obtained through the speech recognition is performed (S1016; No).

Thereafter, the speech input and output device 40 receives the speech data from the server device 10, and plays the received speech data (S1022→S1024). At this time, the user says the numbers of the last 4 digits among the device ID displayed on the front surface of the identification device 30 according to the played speech data. The speech input and output device 40 transmits the speech of the speech identification information of the user, as the speech data, to the server device 10 (S1026→S1028).

When the speech data is received, the server device 10 extracts the information corresponding to the numbers of the last 4 digits of the device ID, which is the speech identification information from the speech data by performing the speech recognition of the speech (S1030→S1032→S1034). That is, in the present embodiment, since the numbers of the last 4 digits of the device ID constituted by the numbers made of 12 digits are used as the speech identification information, a portion corresponding to numbers of contiguous 4 digits is extracted from the speech data, and the portion is converted into the text data.

Subsequently, the server device 10 determines whether or not the device ID is received from the identification device 30 (S1052). When the device ID is received, the server device 10 determines whether or not the numbers of the last 4 digits of the device ID (identification information) received in S1006 and the numbers of 4 digits extracted in S1034 match each other (S1052; Yes→S1056).

When the device ID is not received from the identification device 30, the server device 10 determines whether or not timeout occurs (S1052; No→S1054). When a prescribed time elapses, the server device 10 determines that the timeout occurs, and the processing is ended (S1054; Yes). A standby time (for example, one minute) until the processing is performed after the timeout occurs may be configured for the server device 10 in advance or may be configured by the user.

A case where the device ID is not received from the identification device 30 in step S1052 is a case where an instruction to perform login is received from the speech input and output device 40 before the user operates the identification device 30 and the speech identification information is received. In this case, the client server 20 is on standby at a point of time when the speech identification information is received, and performs the processing in S1056 when the device ID is received from the identification device 30 through the operation of the user (S1052; Yes→S1056).

When the device ID and the speech identification information match each other, the server device 10 specifies the user ID corresponding to the device ID from the device information 142 (S1056; Yes→S1058). When the device ID and the speech identification information does not match each other, the server device 10 ends the processing (S1056; No).

Subsequently, the server device 10 specifies the address of the client device corresponding to the address of the speech input and output device 40 from the address correspondence information items 144 (S1060). The server device 10 permits the login using the user ID specified in S1058 to the client device of the specified address (S1062).

Subsequently, the server device 10 transmits the user ID permitted to log in to the client device 20 having the address specified in S1060 (S1064). The client device 20 receives the user ID from the server device 10 (S1066), and the client device 20 can detect that the login using the received user ID is permitted.

Therefore, the client device 20 transmits a content request in order to receive a content to be displayed on the display unit 210 from the server device 10 (S1068). At this time, the client device 20 transmits the user ID permitted to log in.

When the server device 10 receives the content request, the server device 10 transmits a content related to the user ID permitted to log in from the content information items 146 to the client device 20 (S1070→S1072).

When the content information is received, the client device 20 activates a meeting application (S1074→S1076). The client device 20 displays content data included in the content information based on the layout data included in the received content information (S1078).

Although it has been described in the present embodiment that the server device permits the user to log in, the client device may permit the user to log in. That is, the server device may transmit the user ID of which the identification information and the speech identification information match each other to the client device, and the client device may permit the login using the received user ID.

At this time, when the client device permits the login, information (login permission information) permitted to log in is transmitted from the client device to the server device. After the login permission information is received, the server device transmits the content of the user permitted to log in to the client device. By doing this, even when the client device permits the login, the server device can transmit the content related to the user to the client device that permits the login.

When there is a plurality of content information items associated with the user permitted to log in, the server device enables the user to select the content to be displayed based on the content information at the time of displaying the content based on the content information. A display for selecting content information as a display target among a plurality of content information items, the content information items may be displayed so as to be arranged in the order of a meeting name and a last update date and time, or a thumbnail of the content data items to be displayed may be generated and displayed based on the layout data and the content data.

According to the aforementioned embodiment, the user can display the content on the client device 20 through the operation performed for the identification device 30 and the speech input for the speech input and output device 40. In order to determine whether or not to log in through the operation performed on two different devices, even when the user unintentionally operates the identification device 30, since the login is not performed, the login is able to be performed only when the user desires to log in.

Since the speech input and output device 40 and the client device 20 are associated with each other, even when there is a plurality of structures of the speech input and output devices 40 and the client devices 20 within the same NW, only the client device 20 associated with the speech input and output device 40 which inputs the speech is able to be logged in.

In the present embodiment, the server device 10 can detect that the user owns the identification device 30 and can detect the address of the speech input and output device 40 which is the transmission source of the speech data, but does not perform the identification (authentication) of the user. However, as long as the meeting support system 1 is used in a limited place such as inside of a company, the user is limited. Accordingly, it is sufficient to specify an account of a certain user to be used and a position of the user.

That is, since the device ID to be displayed on the front surface of the identification device 30 is used as the speech identification information in a whole or part, the user may not remember the password or may not configure the password. Accordingly, it is possible to log in to the client device 20 with a simple operation, and it is possible to provide the meeting support system with high convenience.

2. Second Embodiment

Next, a second embodiment will be described. The second embodiment is an example in which a guest user temporarily uses the meeting support system. Since the entire structure, functional structure, and processing flow in the present embodiment is the same as those in the first embodiment in principle, different points will be mainly described.

Figures 4, 5:
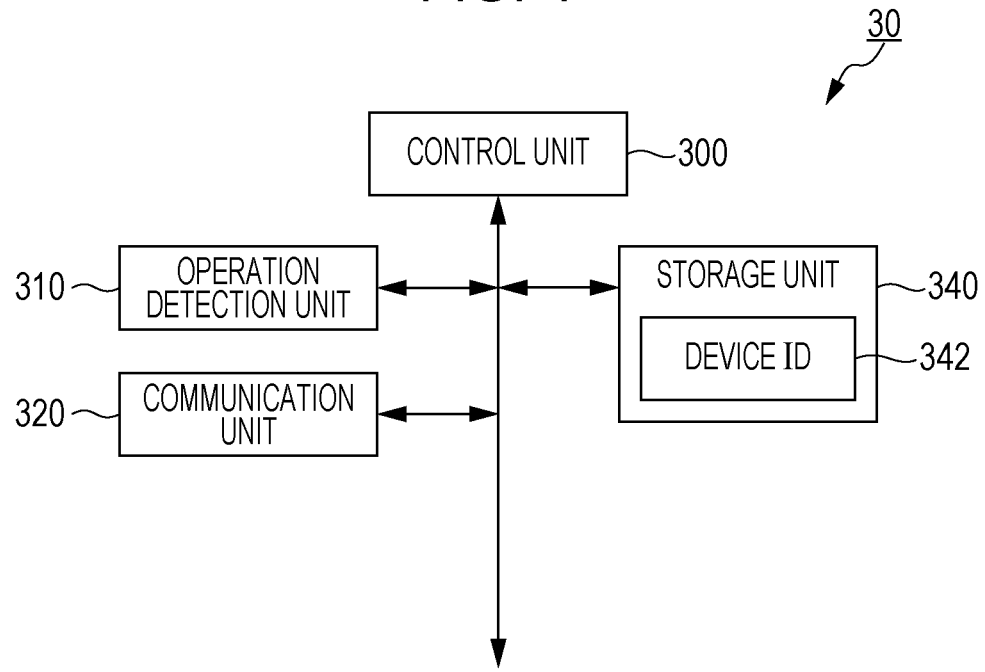
FIG. 4 is a diagram for describing a functional structure of an identification device according to the first embodiment.
FIG. 5 is a diagram illustrating an example of a data structure of device information according to the first embodiment.

The functional structure of the present embodiment, the device information items 142 in the first embodiment illustrated in FIG. 5 are replaced with a data structure of FIG. 10. Here, a time when the login is permitted last in S1066 is stored as the last login date and time (for example, "2017/07/26 13:02"). When the login is not performed so far, information indicating that the login is not performed may be stored, and a special value such as "N/A" may be stored.

As a login time limit (for example, "last login date and time+five hours"), the user determines a time limit in which the user can log in to the server device 10 by using the identification device 30 associated with the user. A determined data and time may be stored or a relative time from the last login date and time may be determined.

Figure 11:
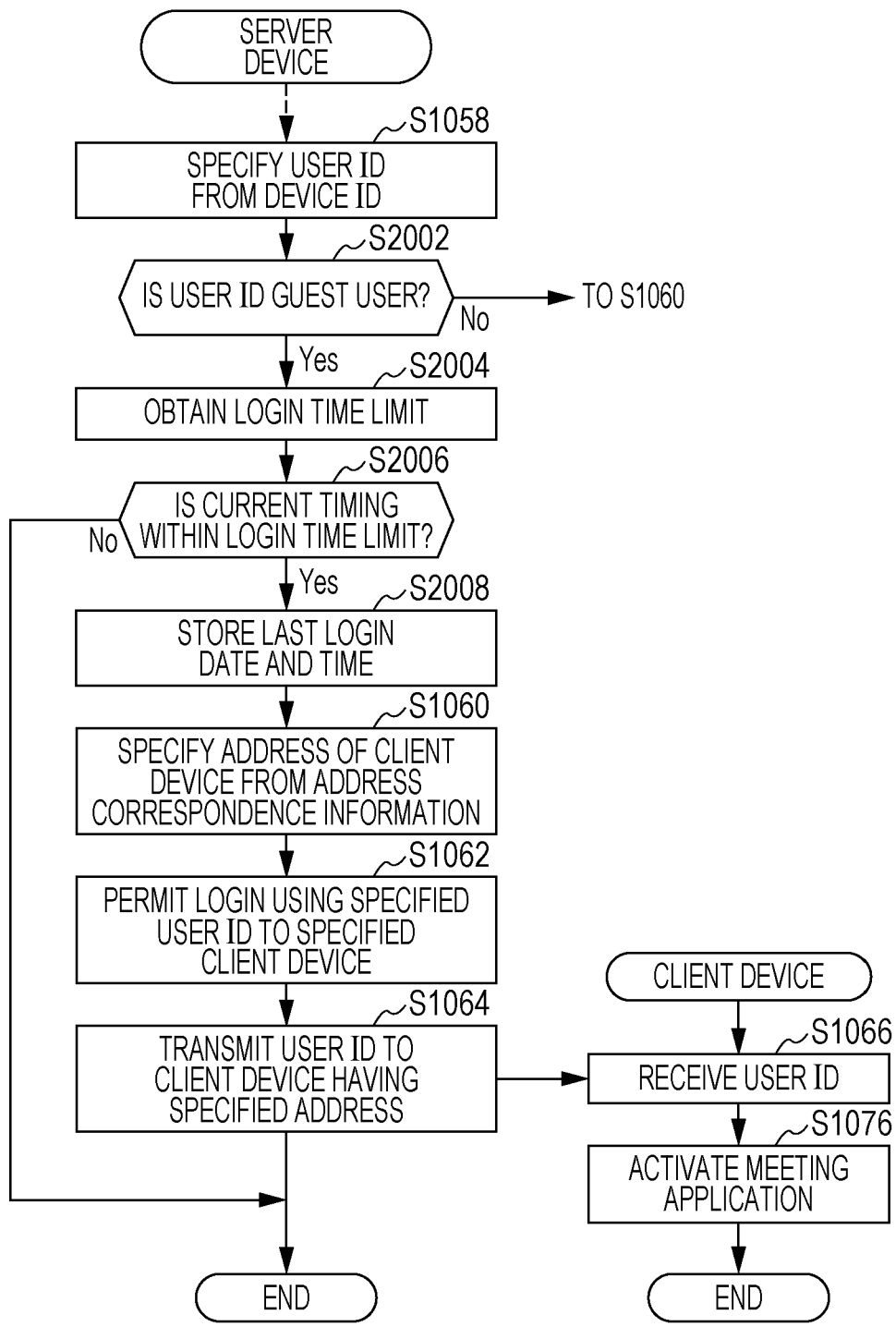
FIG. 11 is a diagram for describing an operation example of a processing flow according to the second embodiment.

The processing flow in the present embodiment is obtained by adding a sequence illustrated in FIG. 11 after S1058 of the first embodiment. Here, when the user ID specified from the device ID is not the user ID of the guest user, the server device performs the processing subsequent to S1060 of the first embodiment (S2002; No→S1060).

For example, the determination of whether or not the user ID is the user ID of the guest user may be performed depending on whether or not a prescribed character is included in the user ID of the guest user. A flag indicating whether or not the user ID is the guest user may be stored as the device information 142, and the determination of whether or not the user ID is the user ID of the guest user may be performed depending on a state of the flag.

When the user ID is the user ID of the guest user, the server device obtains the login time limit of the device information 142 (S2002; Yes→S2004). When a current timing is not within the login time limit, the user is not able to log in to the meeting support system 1, and thus, the server device ends the processing (S2006; No).

When the current timing is within the login time limit, the server device stores the current timing as the last login date and time (S2006; Yes→S2008). Thereafter, the server device performs the processing subsequent to S1060 of the first embodiment.

The guest user temporarily uses the meeting support system, and thus, the server device does not store the content information. Accordingly, when the operation of the login is performed by the guest user, the client device does not perform the request and display of the content, and performs only the activation of the meeting application.

According to the aforementioned embodiment, it is possible to configure the guest user who temporarily uses the meeting support system in advance, and thus, it is possible to omit an effort in registering the device information in advance whenever the client device 20 is temporarily used by the guest user. The guest user can use the client device 20 until the configured time limit by renting the identification device 30. Accordingly, it is possible to expect improvements in convenience in terms of management.

Even though the identification device 30 is not returned, when the login time limit configured for the device ID configured for the identification device 30 is over, since the guest user is not able to log in to the identification device, it is possible to restrain the guest user from fraudulently using the identification device.

The administrator reconfigures the login time limit of the identification device 30 after the identification device 30 is returned, and thus, a different guest user can use the meeting support system 1 by using the same identification device 30. Accordingly, it is possible to reuse the identification device 30.

3. Third Embodiment

Next, a third embodiment will be described. The third embodiment is an example in which meeting clients to use the meeting support system are defined in advance. Since the entire structure, functional structure, and processing flow in the present embodiment is the same as those in the first embodiment in principle, different points will be mainly described.

In the functional structure of the present embodiment, the device information items 142 in the first embodiment illustrated in FIG. 5 are replaced with a data structure of FIG. 12. Here, a department name (for example, "development department") is a name indicating a department or a group to which the user belongs.

Data that stores an address group of the client device available for each department name is stored in the storage unit 150. An example of the data is illustrated in FIG. 13. An address of one or a plurality of client devices may be stored or a character string of "ALL" indicating all the client devices may be stored in the available address group of the client device.

Figure 14:
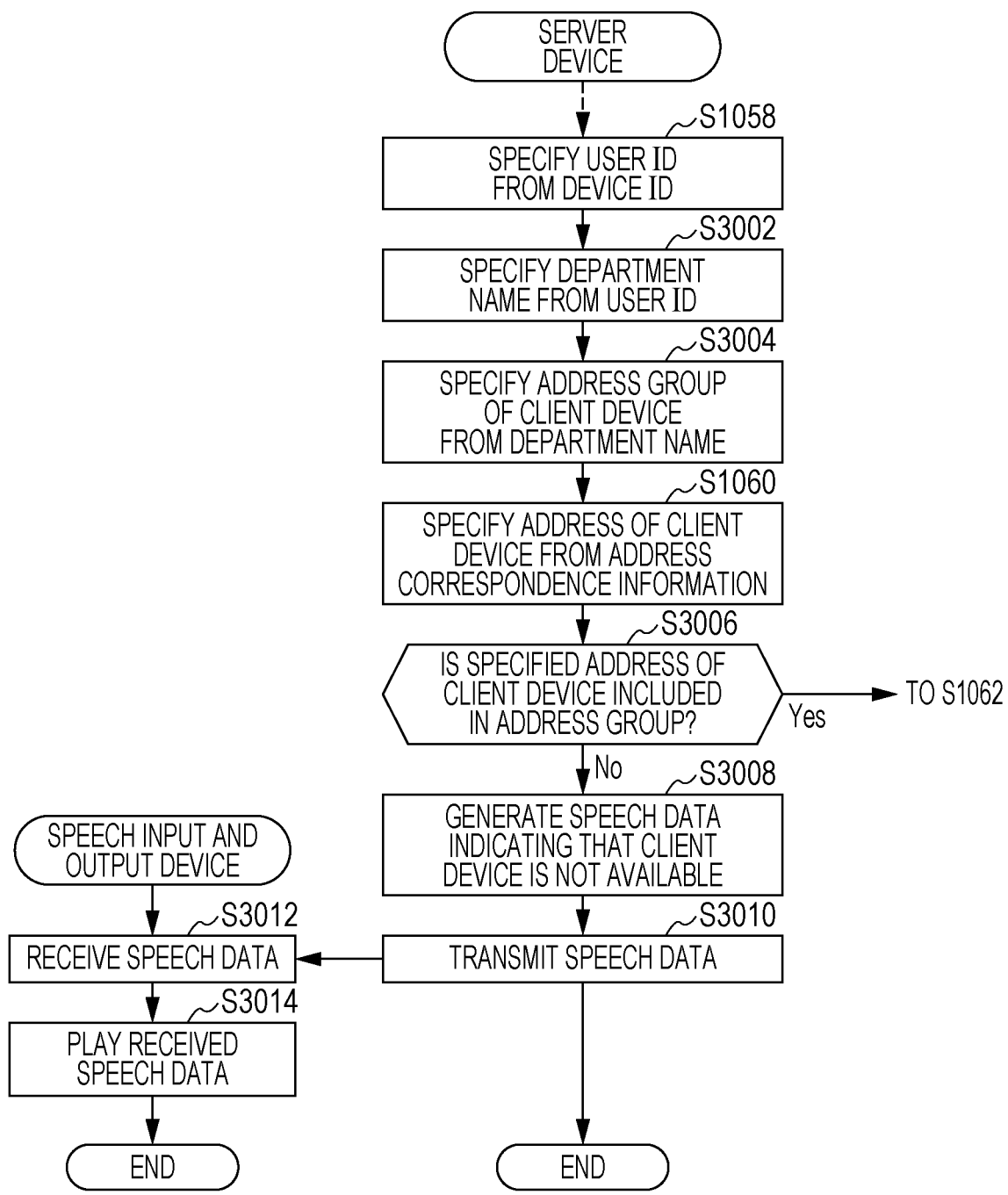
FIG. 14 is a diagram for describing a processing flow according to the third embodiment.

A processing flow of the present embodiment is obtained by adding a sequence illustrated in FIG. 14 after S1058 of the first embodiment. Here, when the user ID specified from the device ID is specified, the server device subsequently specifies the department name of the user (S1058→S3002).

The server device specifies the available address group of the client device from the specified department name (S3004). The server device specifies the address of the client device associated with the address of the speech input and output device 40 from the address correspondence information 144, and determines whether or not the address of the client device 20 is included in the available address group (S1060→S3006).

When the address of the client device 20 is not included in the available address group, the client device 20 associated with the speech input and output device 40 that transmits the meeting start instruction is not available (S3006; No). Accordingly, the server device generates the speech data indicating the client device is not available, and transmits the generated speech data to the speech input and output device 40 (S3008→S3010). The speech input and output device 40 notifies the user that the client device 20 is not available by receiving the speech data and playing the speech data (S3012→S3014).

When the address of the client device 20 is included in the available address group, the server device performs the processing subsequent to S1062 of the first embodiment (S3006; Yes→S1062).

Although it has been described above that the department name is stored as the device information 142, an attribute other than the department name may be stored. For example, an attribute such as a position name and authority name may be stored or the available address group of the client device may be configured for each attribute.

According to the present embodiment, it is possible to limit the available client device 20 based on the attribute of the user. Accordingly, it is possible to restrain a problem that the client device 20 of the own department is used by a user of a different department.

When information to limit access, such as management information, is stored in the storage unit of the client device 20, it is possible to perform management that enables only the user who belongs to a certain department or is at a certain position to use the client device 20. That is, it is possible to limit the user who can use the client device 20 based on the state of the client device 20.

4. Fourth Embodiment

Next, a fourth embodiment will be described. The fourth embodiment is an example in which an answer to a question configured in advance is used as the speech identification information, instead of using the device ID in a whole or part. Since the entire structure, functional structure, and processing flow in the present embodiment is the same as those in the first embodiment in principle, different points will be mainly described.

In the functional structure of the present embodiment, the device information items 142 in the first embodiment illustrated in FIG. 5 are replaced with a data structure of FIG. 15. Here, a registration keyword (for example, "Walter") is a keyword determined by the user. Question 1 (for example, "Tokyo") is an answer to a question predetermined in advance. A plurality of questions may be prepared.

The registration keyword may be stored when the device information is registered in the device information 142, or may be stored through the operation of the user. The registration keyword may be updated at any time. For example, the registration keyword for retrieving the content in the next meeting may be updated just before the meeting is ended.

The storage unit 140 stores a question content. The data structure that stores the question content is illustrated in FIG. 16. A question ID (for example, "question 1") uniquely specifies the question, and the question content (for example, "what is your native prefecture?") is a detailed content of the question. In the present embodiment, the question content and the answer to the question stored as the device information 142 are associated depending on the question ID.

Figure 17:
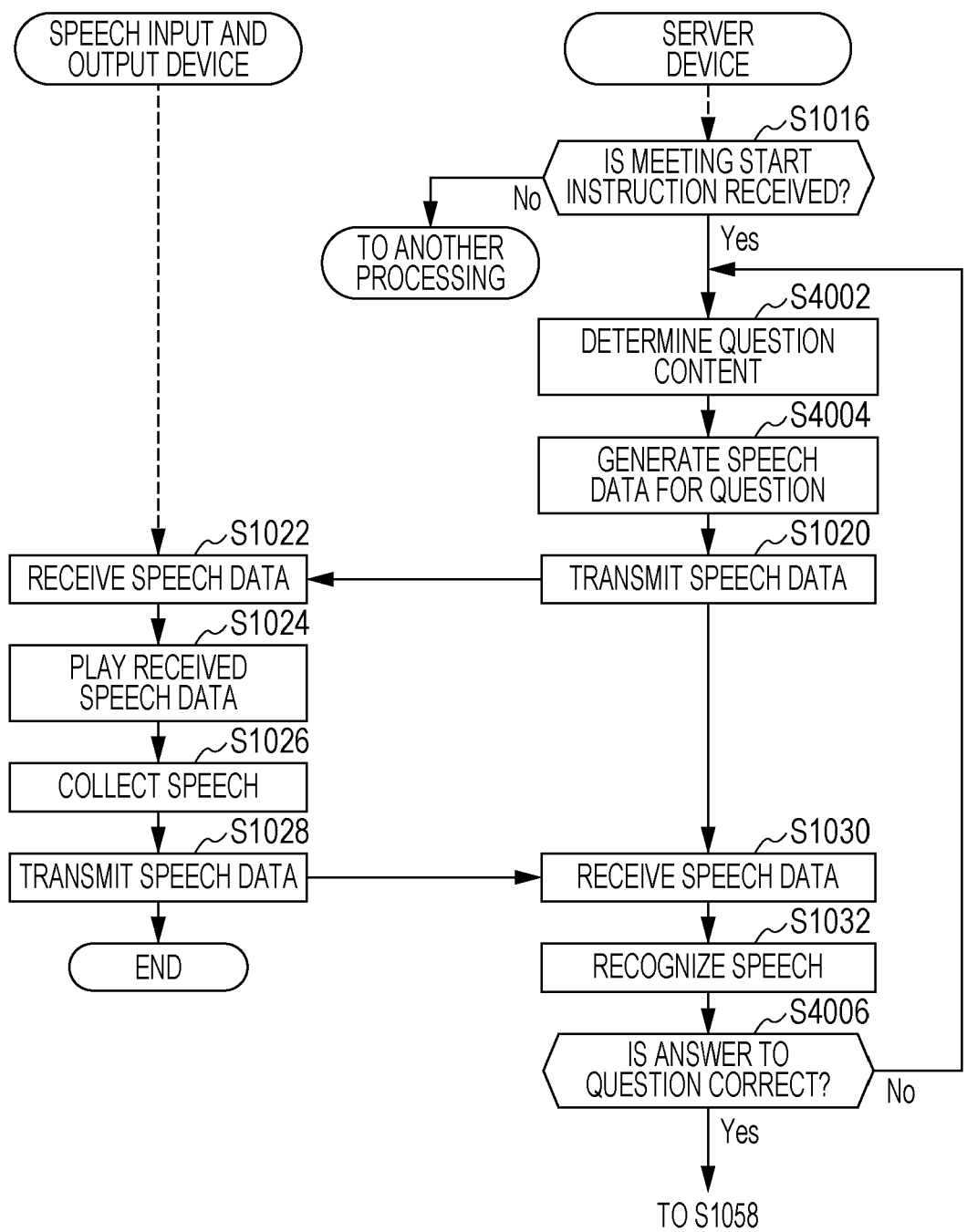
FIG. 17 is a diagram for describing an operation example of a processing flow according to the fourth embodiment.

In the processing flow of the present embodiment, S1016 to S1056 of the first embodiment are replaced with a sequence illustrated in FIG. 17. When the server device determines that the meeting start instruction is received, the server device identifies the user associated with the device ID received in S1006, and determines the question content given to the identified user (S1016→S4002).

For example, when one or a plurality of answers to the question is stored, a question for asking one of the registered answers may be determined. When the answer to the question is not registered, the server device may determine to ask the keyword.

Subsequently, the server device generates speech data for question in order to enable the user to speak the answer to the question content (S4004). When the answer to the question is asked, the speech data may be generated based on the question content. When the keyword is asked, the speech data of the content of "what is the registered keyword?" may be generated.

Subsequently, the server device transmits the generated speech data to the speech input and output device 40, receives the speech data from the speech input and output device 40, and performs the speech recognition of the speech (S1020 to S1032). When the answer to the question is correct as a result of the speech recognition, that is, when the answer of the question or the registered keyword matches the result of the speech recognition, the server device performs the processing subsequent to S1058.

When the answer to the question is not correct, the server device returns to S4002 (S4006; No→S4002). The user asks the answer to the question again in this case, but may ask the same question, or may a question different from the already asked question. The number of times the question is asked may be determined in advance. When the question is asked the determined number of times, the login is not performed, and the server device may end the processing.

According to the aforementioned embodiment, the login is performed by correctly replying the answer to the question determined for each user. That is, since the login is not able to be performed by the user who does not know the answer to the question, it is possible to expect improvements in security compared with a case where the user says the device ID displayed on the identification device 30.

5. Fifth Embodiment

Next, a fifth embodiment will be described. The fifth embodiment is an example in which the login is performed by using fingerprint authentication. The entire structure, functional structure, and processing flow of the present embodiment will be described with reference to the drawings. The same components and portions on which the same processing is performed as those in the first embodiment will be assigned the same references, and the description thereof will be omitted.

5.1 Entire Structure

Figure 18:
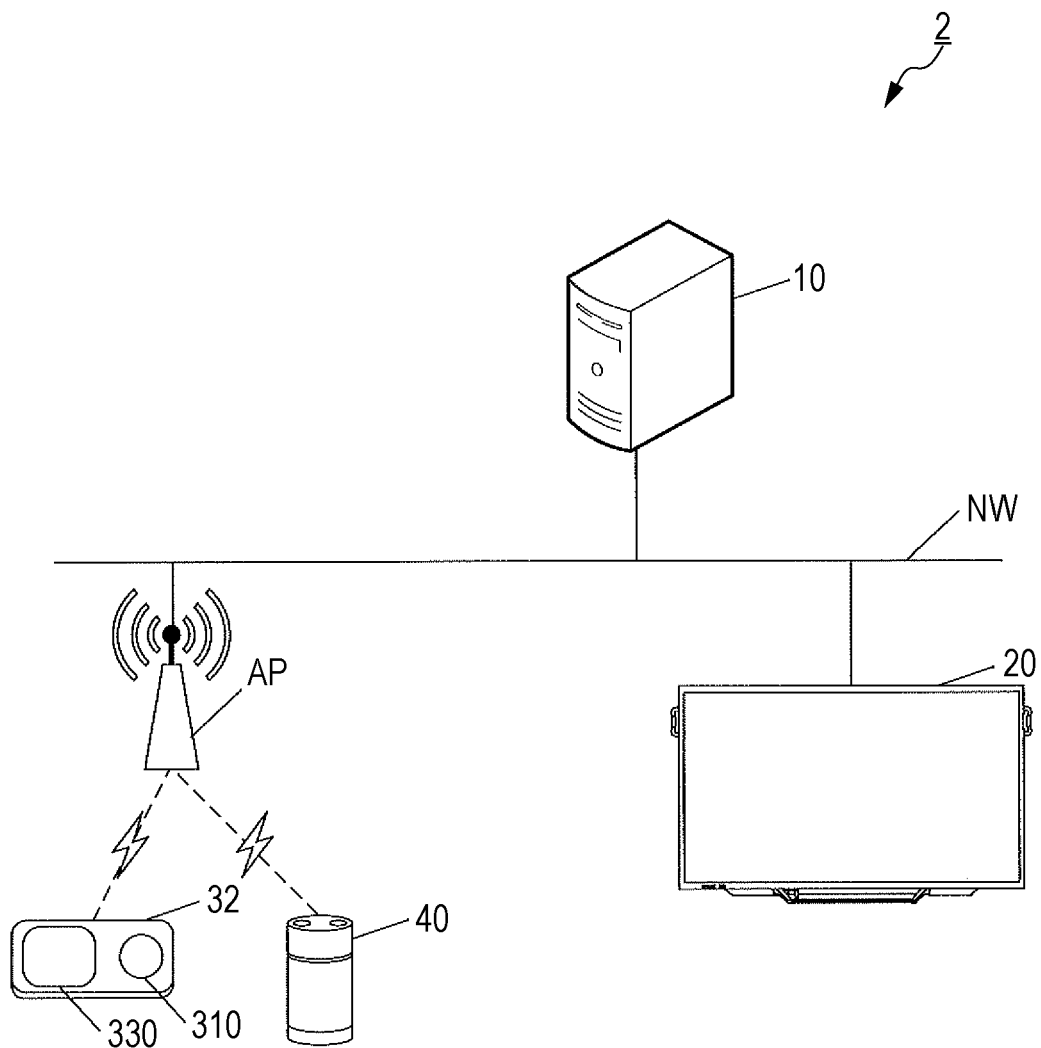
FIG. 18 is a diagram for describing the entire structure of a meeting support system according to a fifth embodiment.

The entire structure of the present embodiment will be described with reference to FIG. 18. FIG. 18 is an external appearance of a meeting support system 2 including a server device 10 to which the present disclosure is applied. The meeting support system according to the present embodiment is configured such that the server device 10, a client device 20, and an access point (AP) are connected to each other via a network (NW). An identification device 32 which is the identification device and the speech input and output device 40 which is the speech input and output device are connected to the AP. It has been illustrated in FIG. 18 that the devices illustrated in this drawing are connected to the same network, the devices may be connected to each other via an external network such as the Internet. For example, the server device 10 may be disposed in a cloud environment.

Between the meeting support system 1 and the meeting support system 2, the server device 10, the client device 20, and the speech input and output device 40 are the same, but the structure of the identification device 32 is different. The identification device 32 according to the present embodiment is a device capable of performing biometrics authentication of the user in addition to the detection of the operation of the user.

5.2 Functional Structure 5.2.1 Server Device

A functional structure of the server device 10 according to the present embodiment will be described. The functional structure of the server device 10 is substantially the same as the functional structure of the first embodiment, but the structure of the device information 142 is different.

A data structure of the device information 142 according to the present embodiment will be described with reference to FIG. 20. User IDs (for example, "MU119") for identifying the user who owns the identification device and user names (for example, "Munakata") are stored as the device information 142.

5.2.2 Identification Device

Figures 19, 20:
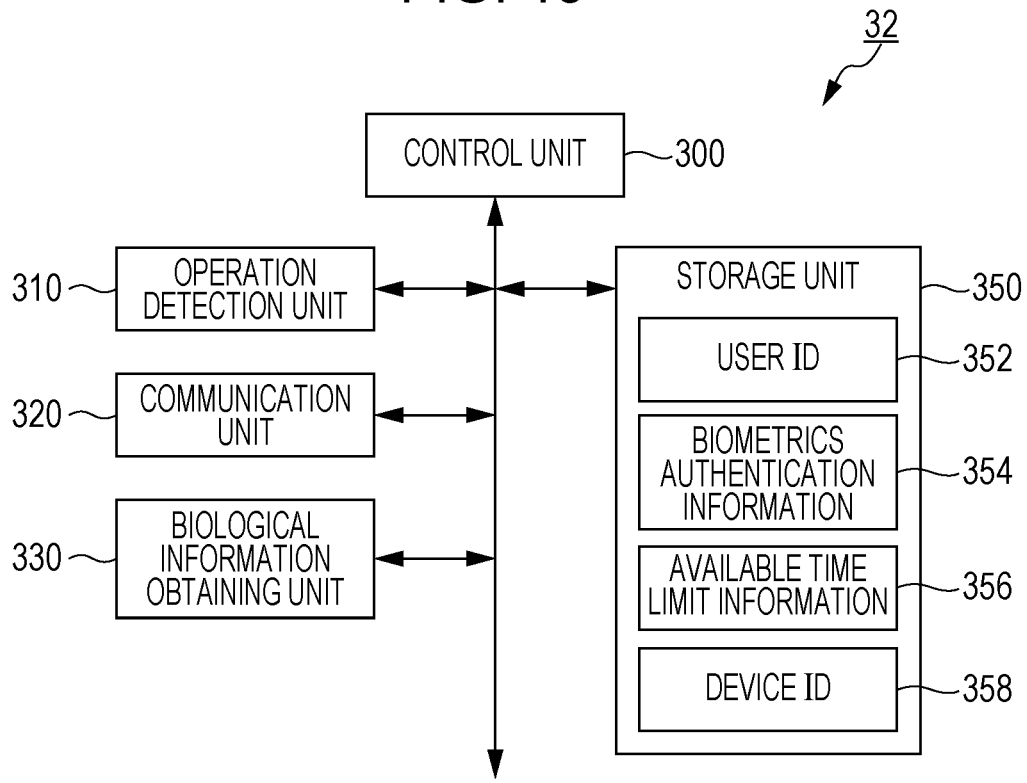
FIG. 19 is a diagram for describing a functional structure of an identification device according to the fifth embodiment.
FIG. 20 is a diagram illustrating an example of a data structure of device information according to the fifth embodiment.

A functional structure of the identification device 32 is illustrated in FIG. 19. The identification device 32 includes a control unit 300, an operation detection unit 310, a communication unit 320, a biological information obtaining unit 330, and a storage unit 350. Here, the control unit 300, the operation detection unit 310, and the communication unit 320 are the same as those of the identification device 30 according to the first embodiment.

The biological information obtaining unit 330 is a functional unit for obtaining biological information of the user who uses the identification device 32. Fingerprints, blood vessels, or irises may be used as the biological information. In the present embodiment, in order for the identification device 32 to authenticate the user by using the fingerprint, the fingerprint is used as the biological information obtained by the biological information obtaining unit 330, and a fingerprint sensor for reading the fingerprint is used as the biological information obtaining unit 330.

The storage unit 350 is a functional unit that stores various programs or various data items to be used in the operation of the identification device 32. For example, the storage unit 350 is constituted by a flash memory.

Particularly, the storage unit 350 stores user IDs 352 for identifying the users who use the identification devices 32, biometrics authentication information items 354 to be used to perform the biometrics authentication of the users, available time limit information items 356 indicating time limits in which the authentication using the biometrics authentication information items 354 is able to be performed, and device IDs 358 for identifying the identification devices 32.

The biometrics authentication information 354 is information to be compared with the biological information read by the biological information obtaining unit 330. In the present embodiment, in order to read a pattern of the fingerprint of the user by using the fingerprint sensor as the biological information obtaining unit 330, the pattern of the fingerprint of the user of the identification device 32 is stored as the biometrics authentication information 354.

5.3 Processing Flow

Figure 21:
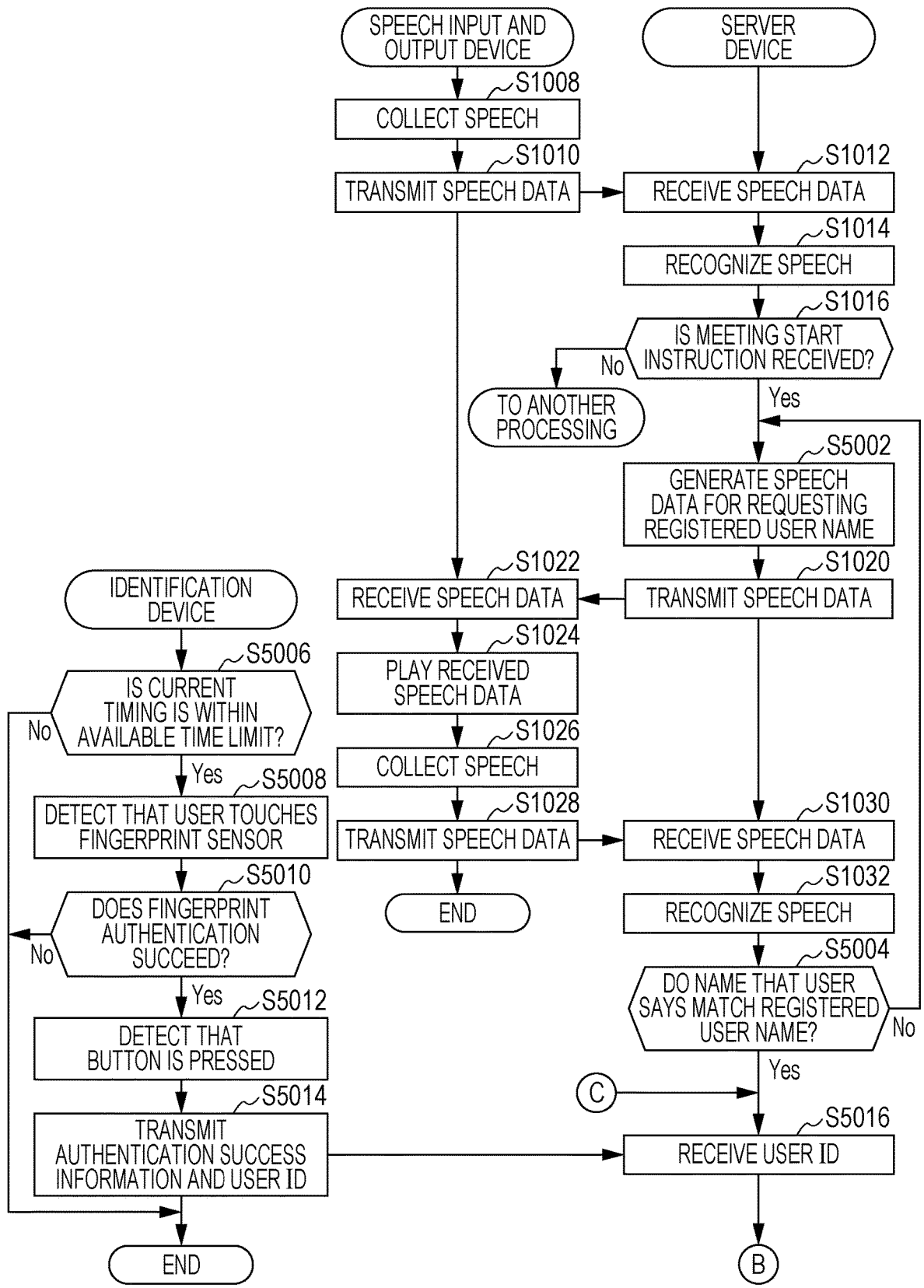
FIG. 21 is a diagram for describing a processing flow according to the fifth embodiment.
Figure 22:
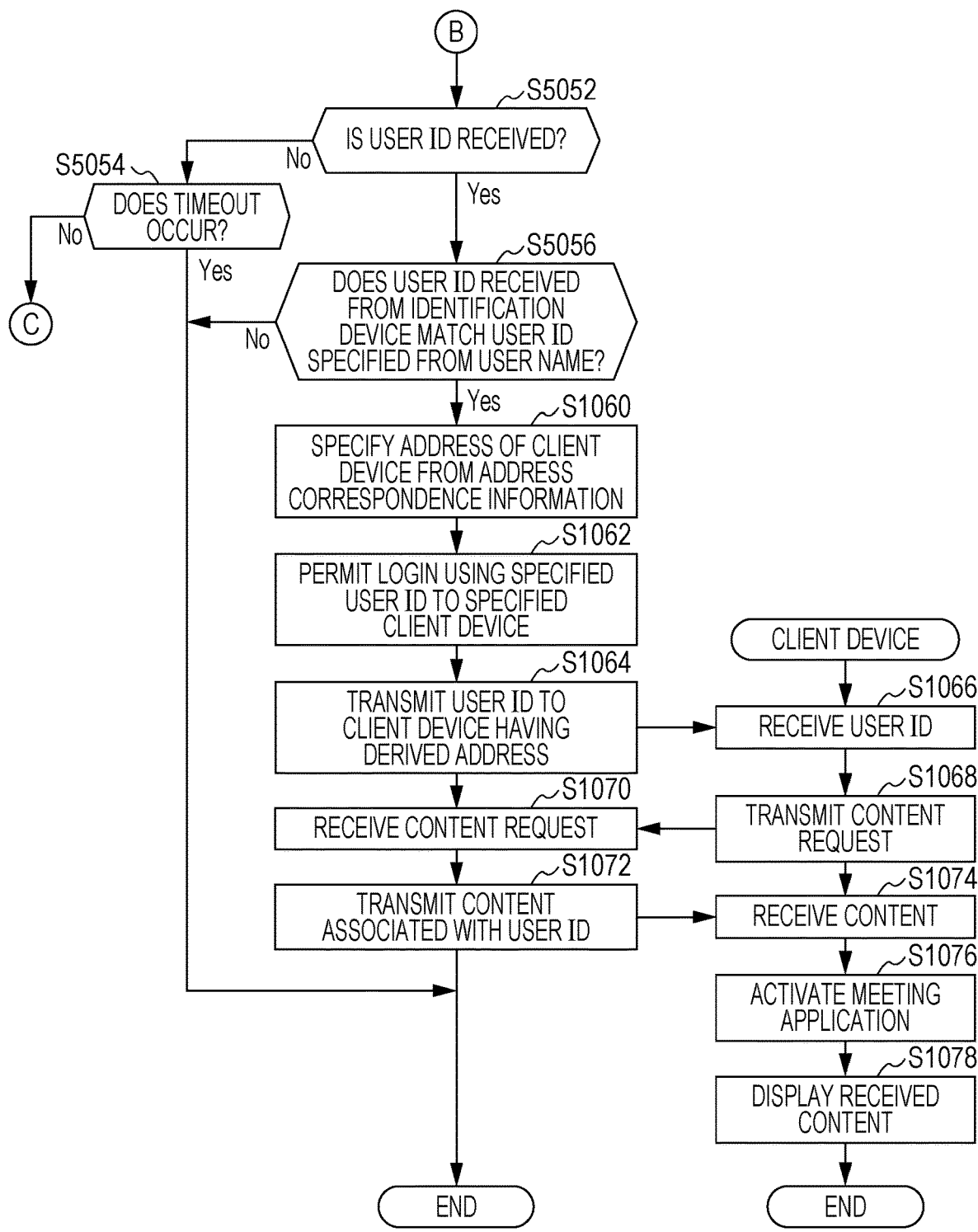
FIG. 22 is a diagram for describing a processing flow according to the fifth embodiment.

Next, a processing flow according to the present embodiment will be described. In the processing flow of the present embodiment, FIGS. 8 and 9 that describe the processing flow of the first embodiment are replaced with FIGS. 21 and 22. The processing represented by the same references as the references in FIGS. 8 and 9 is the processing of the first embodiment, and the description thereof will be omitted.

When the meeting start instruction is issued by the user, the server device generates speech data for requesting any of the user names stored as the device information items 142 (S1016; Yes→S5002).

Subsequently, when the speech data is received from the speech input and output device 40, the server device performs the speech recognition, and determines whether or not a name that the user says matches any of the user names stored as the device information items 142 (S1030→S1032→S5004). When the name that the user says matches any of the user names stored as the device information items 142 as the result of the speech recognition of the speech data, the server device is on standby in order to receive the user ID to be transmitted from the identification device 32 (S5004; Yes). When the name that the user says does not match any of the stored user names, the server device performs the processing of S5002 (S5004; No→S5002).

Initially, the identification device 32 reads out the available time limit information 356, compares the readout time limit with the current timing, and determines whether or not the current timing is within a time limit in which the identification device 32 is available (S5006). When the current timing exceeds the available time limit, the identification device 32 ends the processing (S5006; No).

When the current timing is within the available time limit, the identification device 32 is on standby until the identification device detects that the user touches the fingerprint sensor (S5006→S5008). When the user touches the fingerprint sensor, the identification device 32 subsequently reads the pattern of the fingerprint of the user, and performs the authentication (fingerprint authentication) of the user using the fingerprint (S5010). Here, when the pattern of the fingerprint read by the fingerprint sensor and the pattern of the fingerprint stored as the biometrics authentication information 354 of the identification device 32 may not match each other with sufficient precision, the identification device 32 determines that the fingerprint authentication fails, and ends the processing (S5010; No).

When the fingerprint authentication succeeds, the identification device 32 is on standby until the identification device detects that the button of the identification device 32 is pressed by the user (S5010; Yes→S5012). In this state, when the identification device 32 detects that the button is pressed by the user, the identification device 32 transmits the user ID 352 and information indicating the authentication succeeds to the server device 10 (S5014).

The server device 10 is on standby in order to receive the user ID after the determination of S5004 (S5016). Here, when a prescribed time elapses without receiving the user ID, the server device determines that timeout occurs, and ends the processing (S5052; No→S5054; Yes).

When the user ID is received, the server device determines that the user ID received from the identification device 32 and the user ID specified from the user name obtained by performing the recognizing the speech data received in S1030 match each other (S5052; Yes→S5056). The server device performs the processing of S1060 when the received user ID and the specified user ID match each other (S5056; Yes→S1060), and ends the processing when the received user ID and the specified user ID do not match each other (S5056; No).

According to the aforementioned embodiment, since the identification device 32 performs the fingerprint authentication, it is possible to restrain the login of the user who is not the owner of the identification device 32, and it is possible to enable the user to log in in a state in which technical safety is further secured.

Although it has been described in the aforementioned processing flow that the user ID is transmitted to the server device 10 only when the fingerprint authentication succeeds in the identification device 32, the user ID and the authentication result may be transmitted. That is, information indicating that the authentication succeeds and the user ID are transmitted when the authentication succeeds, and information indicating that the authentication fails is transmitted to the server device 10 when the authentication fails. In this case, when the server device 10 detects that the fingerprint authentication fails many times in the same identification device 32, the identification device 32 may be unavailable. By doing this, it is possible to cope with the case where the user loses the identification device 32.

6. Sixth Embodiment

Next, a sixth embodiment will be described. The sixth embodiment is an example in which biometrics authentication information items of a plurality of users are stored in the identification device 32. Since the entire structure, functional structure, and processing flow in the present embodiment is the same as those in the fifth embodiment in principle, different points will be mainly described.

Figures 23, 24:
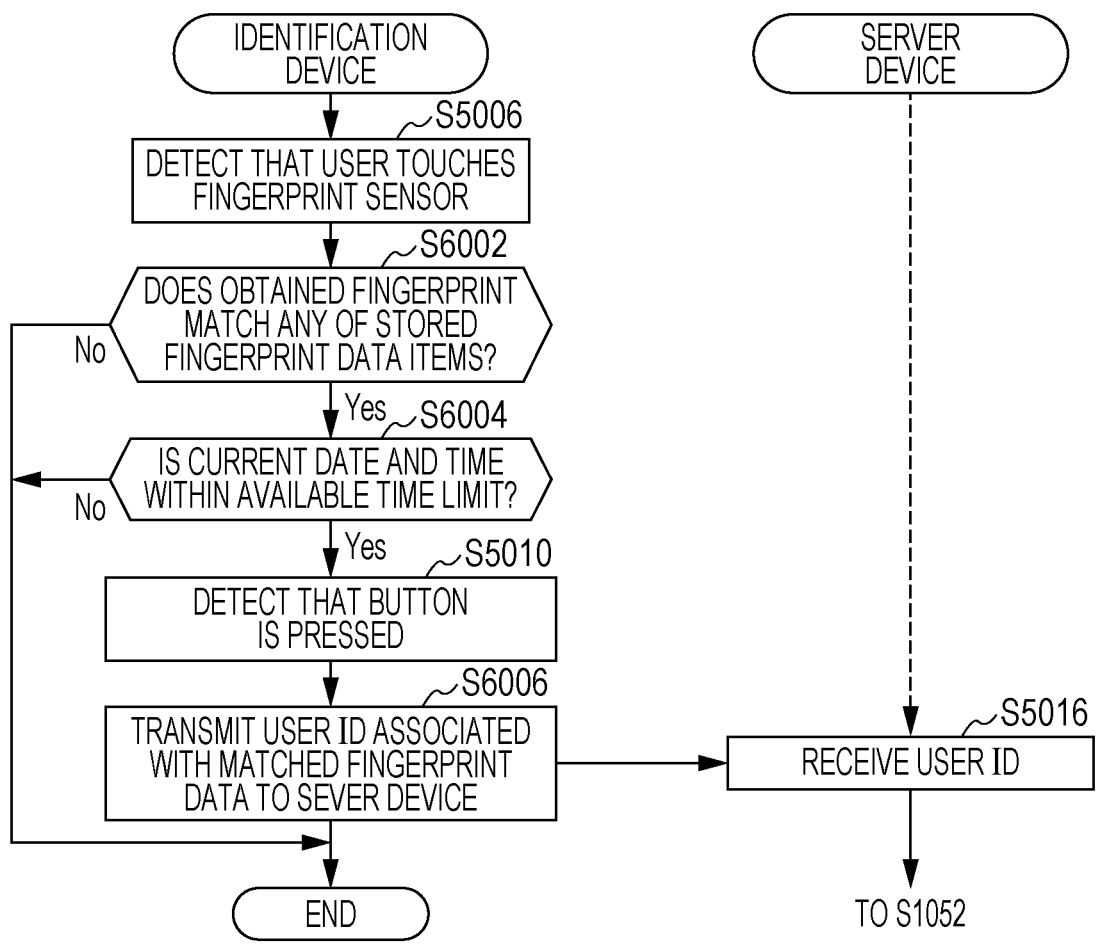
FIG. 23 is a diagram illustrating an example of a data structure of biometrics authentication information according to a sixth embodiment.
FIG. 24 is a diagram for describing a processing flow according to the sixth embodiment.

The user ID, the biometrics authentication information, and the available time limit information in association with each user of the plurality of users who use the identification devices 32 are stored in the storage unit 350 of the identification device 32. An example of the specific data structure is illustrated in FIG. 23. In the data structure illustrated in FIG. 23, fingerprint data of each user is stored as the biometrics authentication information. The available time limit may be stored for each user or one available time limit may be stored for one identification device 32, and a validated time limit of the identification device 32 may be determined and managed.

In the processing flow of the present embodiment, S5006 to S5014 of the fifth embodiment are replaced with a sequence illustrated in FIG. 24. When the identification device detects that the user touches the fingerprint sensor, the identification device determines whether or not the fingerprint obtained from the fingerprint sensor matches any of the fingerprint data items stored in the storage unit 350 with sufficient precision (S5006→S6002).

When the obtained fingerprint and any of the stored fingerprint data items do not match each other, the identification device ends the processing (S6002; No). When the obtained fingerprint and any of the stored fingerprint data items match each other with sufficient precision, the identification device 32 specifies the available time limit associated with the matched fingerprint data, and determines whether or not a current date and time is within the available time limit (S6002; Yes→S6004). When the current date and time exceeds the available time limit, the identification device ends the processing (S6004; No).

When the current date and time is within the available time limit and the identification device 32 detects that the button of the identification device 32 is pressed, the identification device 32 specifies the user ID associated with the matched fingerprint data, and transmits the specified user ID to the server device 10 (S6004; Yes→S5010→S6006). By performing the processing in this manner, the login of only the user for which the fingerprint authentication succeeds to the client device 20 is permitted.

According to the aforementioned embodiment, the identification devices 32 as much as the number of persons who use the meeting support system 1 may not be prepared. Accordingly, the button may be provided for each department or for each client device 20, and thus, it is possible to reduce costs. Since the number of identification devices 32 to be managed is reduced, it is possible to simplify the management of the identification device 32.

7. Modification Example

While the embodiments of the disclosure will be described in detail with reference to the drawings, the specific structure is not limited to the embodiments, and designs within the scope without departing from the gist of the disclosure are included in claims.

The aforementioned embodiments may be performed by combining the respective embodiments. For example, the available client devices 20 may be managed by using the identification devices 32 capable of performing the biometrics authentication by combining the third embodiment with the fifth embodiment.

The program operated in each device in the embodiments is a program (program causing a computer to function) that controls a CPU to realize the functions of the aforementioned embodiments. The information items used in these devices are temporarily accumulated in a temporary storage device (for example, random-access memory (RAM)) at the time of processing the information items, and are subsequently stored in various storage devices such as read-only memory (ROM), HDD, and SSD. The information items are read by the CPU, and are modified or written.

When the programs are distributed in the market, the programs may be distributed while programs are stored in a portable recording medium or may be transmitted to the server device computer connected via the network such as the Internet. In this case, a storage device of a server device computer is also included in the disclosure.

The present disclosure contains subject matter related to that disclosed in Japanese Priority Patent Application JP 2017-191549 filed in the Japan Patent Office on Sep. 29, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A server device that communicates with a client device capable of processing a content corresponding to a user, the server device comprising:
an identification information storage unit that stores device information associating device identification information that identifies an identification transmission device owned by the user with user identification information that identifies the user;
an identification information reception unit that receives the device identification information from the identification transmission device;
an identification information recognition unit that receives speech data from a speech input and output device, and recognizes speech identification information from the speech data;
a login unit that specifies the user based on the device information when the device identification information and the speech identification information match each other, and then permits the user specified to log in; and
a content display control unit that causes the client device to display the content associated with the user permitted to log in by the login unit,
wherein the identification information storage unit stores the device identification information as an answer to a question for the user.

2. The server device according to claim 1,
wherein, when a portion designated in the device identification information and the speech identification information match each other, the login unit permits the user corresponding to the device identification information to log in.

3. The server device according to claim 1, further comprising:
a management unit that manages the speech input and output device and the client device in association with each other,
wherein the content display control unit causes the client device corresponding to the speech input and output device that receives the speech data to display the content.

4. The server device according to claim 1,
wherein, when the content display control unit causes the client device to display the content, the content is displayed by restoring a display layout of the content to a display layout of the content when the user logs out.

5. The server device according to claim 1,
wherein, when it is determined that the device identification information and the speech identification information match each other and the user is able to log in to the client device corresponding to the speech input and output device, the login unit permits the user corresponding to the device identification information to log in.

6. A server device that communicates with a client device capable of processing a content corresponding to a user, the server device comprising:
an identification information storage unit that stores device information associating device identification information that identifies an identification transmission device owned by the user with user identification information that identifies the user;
an identification information reception unit that receives the device identification information from the identification transmission device;
an identification information recognition unit that receives speech data from a speech input and output device, and recognizes speech identification information from the speech data;
a user identification information transmission unit that specifies the user based on the device information when the device identification information and the speech identification information match each other, and then transmits, to the client device, user identification information of the user specified; and
a content display control unit that causes the client device to display the content associated with the user,
wherein the identification information storage unit stores the device identification information as an answer to a question for the user.

7. The server device according to claim 6, further comprising:
a login permission information reception unit that receives login permission information from the client device, wherein the content display control unit causes the client device to display the content, based on the received login permission information.

8. A server client system comprising:
a client device capable of processing a content corresponding to a user;
an identification transmission device that is owned by the user and stores device identification information; and
a server device that communicates with the client device, wherein
the identification transmission device includes an identification information transmission unit that transmits the device identification information to the server device through a selection operation by the user,
the server device includes
an identification information storage unit that stores device information associating device identification information that identifies the identification transmission device owned by the user with user identification information that identifies the user,
an identification information reception unit that receives the device identification information from the identification transmission device,
an identification information recognition unit that receives speech data from a speech input and output device, and recognizes speech identification information from the speech data,
a login unit that specifies the user based on the device information when the device identification information and the speech identification information match each other, and then permits the user specified to log in, and
a content transmission unit that transmits, to the client device, the content associated with the user permitted to log in by the login unit, and
the client device includes a content display control unit that receives the content from the server device, and performs a control to display the content,
wherein the identification information storage unit stores the device identification information as an answer to a question for the user.

9. A server client system comprising:
a client device capable of processing a content corresponding to a user;
an identification transmission device that is owned by the user and stores device identification information; and
a server device that communicates with the client device, wherein
the identification transmission device includes an identification information transmission unit that transmits the device identification information to the server device through a selection operation by the user,
the server device includes
an identification information storage unit that stores device information associating device identification information that identifies the identification transmission device owned by the user with user identification information that identifies the user,
an identification information reception unit that receives the device identification information from the identification transmission device,
an identification information recognition unit that receives speech data from a speech input and output device, and recognizes speech identification information from the speech data,
a user identification information transmission unit that specifies the user based on the device information when the device identification information and the speech identification information match each other, and then transmits, to the client device, user identification information of the user specified,
a login permission information reception unit that receives login permission information to be transmitted from the client device, and
a content transmission unit that transmits, to the client device, the content associated with the user permitted to log in, based on the received login permission information, and
the client device includes
a login information reception unit that receives the user identification information from the server device,
a login permission unit that permits the user corresponding to the user identification information to log in based on the user identification information,
a login permission information transmission unit that transmits the login permission information to the server device when the user is permitted to log in, and
a content display control unit that receives the content from the server device, and performs a control to display the content.

10. The server device according to claim 1, further comprising:
an address correspondence information storage unit that stores address correspondence information that correlates an address of the client device and an address of the speech input and output device,
wherein the login unit specifies the address of the client device from the address of the speech input and output device based on the address correspondence information, and permits the user specified to log in to the client device whose address is specified.

11. The server device according to claim 6, further comprising:
an address correspondence information storage unit that stores address correspondence information that correlates an address of the client device and an address of the speech input and output device,
wherein the user identification information transmission unit specifies the address of the client device from the address of the speech input and output device based on the address correspondence information, and transmits the user identification information of the user specified to the client device whose address is specified.

12. The server client system according to claim 8, wherein
the server device further includes an address correspondence information storage unit that stores address correspondence information that correlates an address of the client device and an address of the speech input and output device, and
the login unit specifies the address of the client device from the address of the speech input and output device based on the address correspondence information, and permits the user specified to log in to the client device whose address is specified.

13. The server client system according to claim 9, wherein
the server device includes an address correspondence information storage unit that stores address correspondence information that correlates an address of the client device and an address of the speech input and output device,
wherein the user identification information transmission unit specifies the address of the client device from the address of the speech input and output device based on the address correspondence information, and transmits the user identification information of the user specified to the client device whose address is specified.

\* \* \* \* \*